United States Patent [19]
Dhein et al.

[11] 3,849,160
[45] Nov. 19, 1974

[54] COATING WITH PULVERULENT MIXTURES OF HYDROXY CONTAINING POLYMERS AND ε-CAPROLACTAM MASKED POLYISOCYANATES

[75] Inventors: Rolf Dhein; Hans Rudolph; Hans-Joachim Kreuder, all of Krefeld-Buckum; Herbert Gebauer, Krefeld, all of Germany

[73] Assignee: Bayer Aktiengesellschaft, Leverkusen, Germany

[22] Filed: Dec. 26, 1972

[21] Appl. No.: 318,670

Related U.S. Application Data

[63] Continuation-in-part of Ser. No. 215,110, Jan. 3, 1972, abandoned, which is a continuation-in-part of Ser. No. 78,217, Oct. 5, 1970, abandoned.

[30] Foreign Application Priority Data
Dec. 28, 1970 Germany............................ 2064098
May 8, 1971 Germany............................ 1957483

[52] U.S. Cl................ 117/17, 117/21, 117/132 R, 117/132 C, 117/DIG. 6
[51] Int. Cl................ B05b 5/02, B44d 1/095
[58] Field of Search....... 117/17, 21, DIG. 6, 132 R, 117/132 C; 260/75 NE, 75 NK, 77.5 T, 77.5 B

[56] References Cited
UNITED STATES PATENTS

| | | | |
|---|---|---|---|
| 2,801,990 | 8/1957 | Seeger et al. | 260/75 |
| 2,982,754 | 5/1961 | Sheffer et al. | 260/33.4 |
| 3,236,812 | 2/1966 | McElroy | 260/75 |
| 3,326,861 | 6/1967 | Sandridge | 260/75 |
| 3,441,541 | 4/1969 | D'Ancicco et al. | 260/77.5 |

FOREIGN PATENTS OR APPLICATIONS
1,146,641    3/1969    Great Britain........................ 117/17

*Primary Examiner*—Michael Sofocleous
*Attorney, Agent, or Firm*—Connolly and Hutz

[57] ABSTRACT

The invention relates to a process of forming a continuous coating on an article by spraying a pulverulent mixture of a polymer containing hydroxy groups having a softening point of at least 40°C and of a masked polyisocyanate through an electric field on an article to adhere the said mixture to said article and baking said mixture to fuse it into a continuous coating the improvement which comprises using as a masked polyisocyanate a ε-caprolactam masked polyisocyanate.

6 Claims, No Drawings

COATING WITH PULVERULENT MIXTURES OF HYDROXY CONTAINING POLYMERS AND ε-CAPROLACTAM MASKED POLYISOCYANATES

This application is a continuation in part application of application Ser. No. 215,110, filed Jan. 3, 1972, and now abandoned which in turn is a continuation in part application of application Ser. No. 78 217, filed Oct. 5, 1970, now abandoned.

The present invention relates to pulverulent film-forming coating materials of the type used for electrostatic powder spraying.

In the method of electrostatic powder spraying a pulverulent film forming coating material is sprayed on an article through an electrostatic field whereby the coating material adheres to the article by the electrostatic charge. The field used to provide the electrostatic charge must be sufficient to cause the coating material to stick to the article until it is baked to fuse the coating into a continuous surface. It is possible to modify this method by heating the article to be coated to a temperature which is below the fusion temperature of the coating material, then spraying the article with the electrostatically charge powder and baking the coated article.

It is known from British Patent Specification No. 1,146,641 to apply pulverulent mixtures of (a) high-melting polyesters containing hydroxyl groups and (b) polyisocyanates whose isocyanate groups are phenol-masked, onto substrates by electrostatic powder spraying. Disadvantages of this process include the highly objectionable elimination of phenol, a reactivity which is frequently insufficient even in the presence of catalysts, and especially blister formation and other levelling faults, which can make the coatings valueless.

It has been found that these disadvantages are avoided if polyisocyanates which are ε-caprolactam-masked are used instead of the above mentioned phenol-masked compounds.

The present invention therefore provides pulverulent film-forming coating materials curable by heating to temperatures of at least 130°C (preferably 150°C to 210°C) comprising solid polymers which contain hydroxy groups and which have softening points of at least 40°C, preferably between 40° and 90°C (when determined by the differential thermonanalysis method) and ε-caprolactam-masked polyisocyanates.

Suitable solid polymers of the aforementioned type are polyesters, polyethers, polyurethanes, polyester urethanes, alkyd resins, urethane alkyd resins and/or polymers of olefinically unsaturated monomers which products contain hydroxyl groups.

The masked polyisocyanates are in general used in amounts from 10 to 60, preferably 15 to 30, per cent by weight as calculated on the weight of the polymers containing hydroxyl groups. The masked polyisocyanates are applied in such amounts that the polymers by reaction with the polyisocyananates are transformed into cross-linked products the crosslinkage being due to the formation of urethane groups. To achieve crosslinkage it is necessary that at least one of the components contains at least three and the other component at least two reactive groups, the reaction groups being hydroxyl groups on the one hand and isocyanate groups on the other hand. However, it is not necessary to use the components in such amounts that equal number of hydroxyl and isocyanate groups are available. It is possible to use the one component, preferably the polymer having hydroxyl groups in a stoichiometric surplus over the other component.

The mixtures containing ε-cprolactam-masked polyisocyanate would crosslink more rapidly on stoving than those which contain phenol-masked polyisocyanates. Therefore it was to be expected that the much greater reactivity of the lactam-masked polyisocyanates would cause crosslinking at the temperatures well below 130°C which are necessary for mixing the components. Surprisingly, this does not normally happen, even in the presence of catalysts. It is furthermore very surprising that the levelling faults, for example blister formation, frequently observed when using phenol-masked polyisocyanates, do not arise when using caprolactam-masked polyisocyanates.

Polyisocyanates which are suitable for being masked with ε-caprolactam, and the manufacture of the masked polyisocyanates are for example given in Houben-Weyl, Methoden der organischen Chemie, Band 14/2, Seiten 61–70. As specific examples of such polyisocyanates there may be mentioned: 2.4- and 2.6-toluylenediisocyanate and the corresponding methylcyclohexyl-diisocyanates, hexamethylenediisocyante, 4,-4'-diisocyanato-diphenyl-methane, 4,4,4''-triisocyanato-triphenylmethane, the adducts of polyols and surplus polyisocyanates e.g., the adduct of trimethylolpropane and toluylenediisocyanate in a molar ratio of 1:3, the reaction product of 3 moles hexamethylenediisocyanate and 1 mol $H_2O$ (biruet-triisocyanate), 1-isocyanato-3-(isocyanatomethyl)-3,5,5 trimethylcyclohexane, 3,3'-dichloro-diphenyl-diisocyanates, 4,4'-diisocyanato-dicyclohexyl-methane and trimethylhexane-diisocyanates. The recited aliphatic, aromatic, cycloaliphatic, and araliphatic polyisocyanates may have their isocyanate groups masked with ε-caprolactam but it is also possible to use incompletely masked polyisocyanates, for example mono-ε-caprolactam-masked 4,-4'-diisocyanato-diphenyl-methane, suitable, but not more than one isocyanate group per molecule should normally be present in the free form, since crosslinking can otherwise already occur on mixing the components. Bis-ε-caprolactam-masked hexamethylenediisocyanate is particularly suitable for the production of highly elastic coatings.

The high-melting polyesters, containing hydroxyl groups, may be produced in known manner by condensing at least one polycarboxylic acid recited hereinafter under 1 and/or 2 and at least one polyhydric aliphatic, araliphatic or cycloaliphatic alcohol recited under 3):

1. cyclic aromatic polycarboxylic acids, such as phthalic acid, isophthalic acid, terephthalic acid, benzene-1,2,4-tri-carboxylic acid, 3,6-dichlorophthalic acid, and tetrachlorophthalic acid;

2. cycloaliphatic polycarboxylic acids, such as tetrahydrophthalic acid, hexahydrophthalic acid and endomethylenetetrahydrophthalic acid;

3. polyols, for example glycol, 1,2-, propanediol, 1,3-butanediol, 1,2-butanediol, 1,4-butanediol, 2,2-dimethylpropanediol, 2,5-hexanediol, 1,6-hexanediol, 4,4'-dihydroxydicyclohexylpropane-2,2, cyclohexanediols, diethylene glycol, bisoxethylated 4,4'-dihydroxy-diphenyl-2,2-propane, glycerine, hexanetriol, pentaerithritol, trimethylolethane and trimethylolpropane.

The cycloaliphatic polycarboxylic acids are usable either alone or in admixture with the cyclic aromatic polycarboxylic acids.

The polyesters can also contain a proportion of condensed monofunctional carboxylic acids, for example benzoic acid, tert-butylbenzoic acid and hexahydrobenzoic acid, as well as acyclic polycarboxylic acids, such as adipic acid and maleic acid. More elastic coatings are in particular obtained when adipic acid is conjointly used.

The polyesters can be manufactured in a manner which is in itself known by esterification or transesterification, optionally in the presence of customary catalysts, and by suitable choice of the COOH/OH relation end-products can be obtained of which the hydroxyl number is generally between 40 and 250, preferably between 40 and 150. The softening points of the polyesters must be so low that the polyesters can be processed at temperatures between about 80° and about 120°C with the additives necessary for the manufacture of the coating materials according to the invention. The softening points must on the other hand be so high that the coating materials according to the invention, obtained from the polyesters, can be ground to give non-caking, free-flowing powders having a particle size of about 20 to about 120μ. In practice this means that the softening points determined according to the differential thermoanalysis method (DTA method see R. C. Mackenzie, Differential Thermal Analysis, London 1970, Vol 1) should be between 40°C and 90°C, preferably between 45°C and 75°C.

Examples for the other hydroxyl groups containing polymers are hydroxyl groups containing polyethers obtainable from the polyols listed above or so-called epoxide resins, such as, for example, obtainable from bisphenols and epichlorhydrin; suitable bisphenols are e.g. 2.2-(4.4'-dihydroxy-diphenyl)-propane, (4.4'-dihydroxy-diphenyl)-methane, 4.4'-dihydroxydiphenyl-ether, 2.2-(3.5.3'5-tetrachloro-4.4'-dihydroxydiphenyl)-propane, 2.2-(3.5.3'.5'-tetrabromo-4.4'-dihydroxydiphenyl)-propane and 2.2-(3.5.3'5'-tetramethyl-4.4'-dihydroxylidiphenyl)-propane.

Further Examples for hydroxyl groups containing polymers are hydroxyl groups containing polyurethanes from the polyols and the polyisocyanates mentioned above, obtained by reacting polyisocyanates with an excess of polyols.

Further examples are hydroxyl and amide group-containing acrylic resins obtainable, by polymerization of, for example, acrylic acid, acrylic acid methyl esters, acrylic acid butyl esters, methacrylic acid, acrylic acid hydroxypropylester, acrylic amide and methacrylic amide. These hydroxyl group-containing polyvinyl resins with hydroxyl numbers approximately 40 and 250, preferably between approximately 40 and 150, are prepared by polymerisation processes known per se such as emulsion, suspension and substance polymerisation or by polymerisation from the corresponding monomers, e.g., hydroxy-propyl-(meth-)acrylic acid ester, hydroxy-ethyl-(meth-)acrylic acid ester, ethyl acrylate, butyl acrylate, 2-ethylhexyl-acrylate, methyl methacrylate, ethyl methacrylate, butyl methacrylate, lauryl-methacrylate, styrene, α-methylstyrene, vinyl toluene, acrylonitrile, acrylamide, vinyl acetate, acrylic acid and methacrylic acid in the presence of solvents and initiators and possibly control substances. Suitable initiators are for example: 2,2'-azo-bis-(2-methylpropionitrile), benzoyl peroxide, tert.-butyl perbenzoate, tert.-butylperoctoate.

If the production of polymers is carried out in the presence of solvents, then the polyvinyl resins are freed of the solvents in suitable aggregates e.g., evaporating screws before they are used as pulverulent lacquer binding agents in accordance with the invention.

Further examples are hydroxyl group-containing polyester urethanes obtained from the polyols, polycarboxylic acids and polyisocyanates mentioned above; further examples are hydroxyl groups-containing alkyd resins obtained from the polyols, polycarboxylic acids and monocarboxylic acids such as saturated or unsaturated fatty acids or mixtures thereof e.g., ethyl hexanoic acid, stearic acid, ricinic acid, coconut fatty acid, soya fatty acid, linseed fatty acid and ground nut fatty acid, and urethane alkyd resins, which are obtained when the polycarboxylic acids are partly or completely replaced by polyisocyanates.

All the hydroxyl groups containing polymers are manufactured in such a way, that the polymers obtained have hydroxyl numbers between 40 and 250, preferably between 40 and 150 and molecular weights between 1000 and 20 000.

As in the case of lacquer binders in solution, pulverulent coating materials may contain not only one of the aforesaid hydroxyl-containing binders and polyisocyanates masked with caprolactam as cross-linking agents but may contain mixtures of hydroxyl-containing binders, and these mixtures may in turn be cross-linked by mixtures of polyisocyanates which are masked with ε-caprolactam. The coating materials according to the invention can be manufactured in suitable mixing equipments, for example in stirred kettles or screw mixers. The conjoint use of solvents, which necessitate evaporation or precipitation, is not necessary. Customary additives, such as pigments, levelling agents, plasticisers, fillers and catalysts, for example the compounds mentioned in German Patent Specification No. 946,173, can also be added in a simple manner without the use of solvents.

The pulverulent coating materials according to the invention can be easily used in the customary manner, that is to say, for example in a fluidized bed or by electrostatic spraying; coatings having excellent properties are obtained by heating to temperatures above about 130°C, preferably between about 150° and 210°C. The invention therefore also provides articles coated with cured coating materials which are according to the invention. The invention is illustrated by the following Examples in which parts are by weight.

EXAMPLE 1

A polyester of hydroxyl number 110 and softening point 55°C (DTA) is manufactured by condensing 9.97 parts by weight of isophthalic acid, 3.12 parts by weight of adipic acid, 10.17 parts by weight of phthalic anhydride, 10.60 parts by weight of neopentylglycol, 7.05 parts by weight of trimethylolpropane and 7.20 parts be weight of 4,4'-dihydroxydicyclohexylpropane at 200°C until an acid number of 3 is reached.

100 parts by weight of this polyester, 50 parts by weight of bis-ε-caprolactam-masked hexamethylene-diisocyanate and 30 parts by weight of a rutile titanium dioxide pigment are intimately mixed on an edge mill, and subsequently homogenised in an extruder at 90° – 100°C. After cooling, the ribbon is granulated and ground by means of a pin mill to a particle size of less than 100μ. The particles thus manufactured are applied to the substrate by means of an electrostatic powder spraying installation at 60 kV. Film-formation to give coatings occurs within 30 minutes at 200°C.

These coatings are hard at layer thicknesses of 60–80 μ and in addition to excellent adhesion show an elasticity of 6 mm in the Erichsen deep drawing test.

EXAMPLE 2

16.37 parts by weight of terephthalic acid dimethyl ester, 24.4 parts by weight of bis-oxyethylated 4,4'-dihydroxydiphenyl-2,2-propane and 1.27 parts by weight of glycerine are condensed in the presence of 0.02 part by weight of titanium tetrabutylate at 220°C until a viscosity of 50" (40 percent strength in ethyl glycol acetate, DIN cup 4) is obtained. The hydroxyl number is about 55 and the softening point is about 70°C (DTA).

100 parts by weight of this polyester, 25 parts by weight of bis-$\epsilon$-caprolactam-masked hexamethylene-diisocyanate and 30 parts by weight of a rutile titanium dioxide pigment are processed as before to give a powder and applied by the EPS process. The resulting coatings are hard at layer thicknesses of 100 – 120 μ and in addition to excellent adhesion shown an elasticity of 10 mm in the Erichsen deep drawing test.

EXAMPLE 3

100 parts by weight of the polyester of example 2, 27 parts by weight of bis-$\epsilon$-caprolactam-masked 1-isocyanato-3-(isocyanato methyl)-3,5,5-trimethylcyclohexane, 30 parts by weight of a rutile titanium dioxide pigment and 1.2 parts by weight of zinc-N-phenyl-ethyl-dithiocarbamate are processed as before to give a powder and applied by the ESP-process on a sheet metal. After heating (30 minutes, 180°C) the obtained coatings are hard at layer thickness of 60 – 80μ and show excellent brightness. They have an excellent adhesion and show an elasticity of 10 mm in the Erichsen deep drawing test.

EXAMPLE 4

2478.0 parts of hexane-1,6-diol and 1206.0 parts of trimethylolpropane are heated to a temperature of 140°C in a nitrogen atomsphere with stirring. 4026.0 parts of hexamethylene-1,6-diisocyanate are added dropwise with stirring at 140°C in the course of about 5 hours. After all the hexamethylene-1,6-diisocyanate has been added, the reaction temperature is still maintained at 140°C for about one hour, until the NCO content has dropped to about 0.2 percent.

A polyurethane having a hydroxyl number of about 165, a viscosity of about 74" (determined at a concentration of 20 percent in m-cresol according to DIN 53 211) and a softening point of 131°C to 134°C according to DIN 53 180 is obtained.

100.0 parts of this polyurethane are intimately mixed with 43.5 parts of hexamethylene diisocyanate which is completely masked with $\epsilon$-caprolactam, 43.0 parts of a rutile titanium dioxide pigment and 1.4 parts of N-ethyl-phenyldithiocarbamic acid zinc as catalyst, using a pug mill, and the mixture is homogenised in an extruder at 125°C to 130°C and when cold it is ground in a pinned disc mill to a particle size of less than 100μ.

The powder produced in this way is applied to the substrate by means of a powder spray installation at 60 kV, and the lacquered pieces are hardened at 200°C for 15 minutes. The coatings, which have thicknesses of 90 to 120μ, are very hard very firmly bonded to their support and at the same time very elastic. Even after 3 days' ageing of the lacquer at 70°C, the Erichsen cupping is 9 mm.

EXAMPLE 5

100 parts of Epicote 1004 (epoxide resin on bisphenol-A base, commercial product of Shell) are intimately mixed with 36.8 parts of the reaction product of 1 mol hexamethylene diisocyanate with 1.75 mol $\epsilon$-caprolactam, 41 parts rutile titanium dioxide pigment and 1.4 parts of N-ethylphenyldithiocarbamic acid zinc as the catalyst, using a pug mill, and the mixture subsequently extruded at 100° – 105° C. After cooling the ribbon is granulated and ground. The powder with a particle size of <100 μ is then applied electrostatically to degreased sheet iron at 60 kV. After a baking period of 30 minutes at 180°C hard and elastic surface coating compositions are obtained with an Erichsen cupping of 7.8 mm and a thickness of 70 μ.

EXAMPLE 6 a. Preparation of a cross-linking agent: 1332 parts of 1-isocyanato-3-(isocyanatomethyl)-3,5,5-trimethylcyclohexane and 504 parts of hexamethylene diisocyanate are heated in a nitrogen atmosphere to 80°C. At this temperature altogether 1017 parts of $\epsilon$-caprolactam are added in several portions to said mixture. When a NCO value of approx. 13 percent has been reached, a total of 402 parts of trimethylol propane are added in 3 equal parts over a period of 4 hours. After each addition the temperature is increased by 20° C until finally 140° C are reached. The mixture is then stirred until the NCO value has fallen to ≤ 2 percent.

b. Preparation of a pulverulent surface coating composition:

100 parts of a vinyl polymer (initial components: 50 percent styrene, 3 percent acrylamide, 17 percent methacrylic acid hydroxy propylester, 30 percent acrylic acid butylester) prepared according to customary methods and having an OH number of 60 – 65, an acid number of 2 – 3, a plasticizing point of 92° – 93° C (according to DIN 53 180) and an average molecular weight of approx. 7000 are processed, as described in Example 5, with 43 parts of the cross-linking agent prepared according to Example 6a, 96 parts of rutile titanium dioxide pigment, 2.8 parts of a flowing agent (Modaflow, commercial product of Monsanto) and 1.4 parts of N-ethylphenyl dithiocarbamic acid zinc and the mixture applied to degreased sheet iron. After a baking period of 30 minutes at 180° C hard surface coating compositions are obtained which are resistant to acetone and show excellent brightness.

EXAMPLE 7 a. Preparation of a cross-linking agent: 2220 parts of 1-isocyanato-3-(isocyanatomethyl)-3,5,5-trimethylcyclohexane are heated to 80°–90°C whilst passing over nitrogen. Within 30 minutes a total of 1130 parts of $\epsilon$-caprolactam are added in several parts thereto and the mixture stirred until the NCO content reaches approx. 12 percent. Over a period of 4 hours 530 parts of diethylene glycol are added dropwise and the temperature simultaneously increased to 130° C. After obtaining an NCO value of ≤ 2 percent, the product is discharged.

b. Preparation of a polyester - polyurethane: 336 parts of perhydrobisphenol A and 103.6 parts of phthalic acid anhydride are heated in an esterification apparatus whilsting passing through nitrogen to 200° C over a period of 4 hours. This temperature is maintained until the resin has reached an acid number of approx. 10 and a viscosity of about 100 – 110 sec. (30 percent in m-cresol according to DIN 53 211). The OH number is about 165 – 170.

637.5 parts of this polyester, 295 parts of hexane-1,6-diol and 201 parts of trimethylol propane are melted at 90° C whilst passing over nitrogen. 714 parts of hexamethylene diisocyanate are added dropwise over 3 hours and the temperature simultaneously increased to 140° C. When the NCO value is ≤ 1 percent, the product is discharged. The polyester - polyurethane has an OH number of 95 – 105, an acid number of approx. 6 and viscosity of approx. 110 – 120 sec. (20 percent in m-cresol according to DIN 53 211). The plasticizing point lies at 71° – 73° C (according to DIN 53 180).

c. Preparation of a pulverulent surface coating composition:

100 parts of the described polyester - polyurethane are processed with 69.4 parts of the cross-linking agent from Example 7a, 113.5 parts of titanium dioxide pigment and 1.7 parts of N-ethyl-phenyl dithiocarbamic acid zinc according to Example 5 to form a pulverulent lacquer binding agent. The powder with a particle size of ≤ 90 μ is sprayed electrostatically onto degreased sheet iron and baked for 30 minutes at 180° C. Hard surface coating compositions resistant to acetone are obtained which show excellent brightness, an Erichsen cupping of 4.5 mm and a layer thickness of 50 μ.

We claim:

1. In the process of forming a continuous coating on an article by the steps of electrostatically spraying a pulverulent mixture of a hydroxyl group containing polymer having a softening point of at least 40°C. and a masked polyisocyanate onto the article and baking said sprayed pulverulent mixture at an elevated temperature to form said continuous coating, the improvement comprising employing as the masked polyisocyanate and ε-caprolactam masked polyisocyanate and a baking temperature of at least about 130°C.

2. The process of claim 1 wherein said pulverulent mixture contains from 10 to 60 percent by weight of said ε-caprolactam masked polyisocyanate, based on the weight of said hydroxyl group containing polymer.

3. The process of claim 2 wherein said percent by weight is from 15 to 30.

4. The process of claim 1 wherein the polyisocyanate of said ε-caprolactam masked polyisocyanate is 1-isocyanato-3-(isocyanatomethyl)-3,5,5-trimethylcyclohexane.

5. The process of claim 1 wherein the hydroxyl number of said hydroxyl group containing polymer is between 40 and 250.

6. The process of claim 5 wherein said hydroxyl number is between 40 and 150.

* * * * *